United States Patent
Matsuhashi

(10) Patent No.: US 9,710,494 B2
(45) Date of Patent: Jul. 18, 2017

(54) DISPLAY CONTROL APPARATUS CAPABLE OF DISPLAYING LIST OF IMAGES CORRESPONDING TO CONTENTS, METHOD OF CONTROLLING THE DISPLAY CONTROL APPARATUS, AND STORAGE MEDIUM

(71) Applicant: CANON KABUSHIKI KAISHA, Tokyo (JP)

(72) Inventor: Kenichi Matsuhashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 14/320,737

(22) Filed: Jul. 1, 2014

(65) Prior Publication Data
US 2015/0009230 A1    Jan. 8, 2015

(30) Foreign Application Priority Data

Jul. 4, 2013  (JP) ................. 2013-140612

(51) Int. Cl.
| | |
|---|---|
| G09G 5/00 | (2006.01) |
| G06F 17/30 | (2006.01) |
| G06F 3/14 | (2006.01) |
| G06T 11/60 | (2006.01) |
| G06F 3/0481 | (2013.01) |
| G06T 11/00 | (2006.01) |
| G06F 9/44 | (2006.01) |
| G06T 19/00 | (2011.01) |

(52) U.S. Cl.
CPC ............ *G06F 17/3028* (2013.01); *G06F 3/14* (2013.01); *G06F 17/30265* (2013.01); *G06F 17/30274* (2013.01); *G06F 3/0481* (2013.01); *G06F 9/4443* (2013.01); *G06T 11/00* (2013.01); *G06T 11/60* (2013.01); *G06T 19/00* (2013.01); *G09G 5/00* (2013.01); *G09G 2320/0613* (2013.01); *G09G 2340/14* (2013.01); *G09G 2350/00* (2013.01)

(58) Field of Classification Search
CPC ......... G06T 11/60; G06T 19/00; G06T 11/00; G06F 9/4443; G06F 3/0481
See application file for complete search history.

(56) References Cited

U.S. PATENT DOCUMENTS 6,581,070 B1 * 6/2003 Gibbon ............. G06F 17/30796
7,933,338 B1 * 4/2011 Choudhry ......... G06F 17/30781
375/240.26

(Continued)

FOREIGN PATENT DOCUMENTS

JP    2009-081866 A    4/2009

*Primary Examiner* — Abderrahim Merouan
(74) *Attorney, Agent, or Firm* — Rossi, Kimms & McDowell LLP

(57) ABSTRACT

A display control apparatus capable of promptly displaying a list of images corresponding to respective contents such that a user can quickly identify the images. The display control apparatus acquires data items of the respective contents or reduced images corresponding to the respective contents, and generates a list screen using the acquired data items or reduced images. The display control apparatus generates the list screen using display objects predetermined in association with attributes of the contents, respectively, before the data items or the reduced images are acquired.

14 Claims, 15 Drawing Sheets

(56) References Cited

U.S. PATENT DOCUMENTS

| | | | |
|---|---|---|---|
| 2006/0156254 A1* | 7/2006 | Satake | G09G 5/00 |
| | | | 715/838 |
| 2006/0271594 A1* | 11/2006 | Haberman | G06F 17/30817 |
| 2008/0118156 A1* | 5/2008 | Okada | G06K 9/00228 |
| | | | 382/195 |
| 2009/0037605 A1* | 2/2009 | Li | G06Q 20/12 |
| | | | 709/246 |
| 2009/0265657 A1* | 10/2009 | Bamford | G06F 3/04886 |
| | | | 715/786 |
| 2011/0113363 A1* | 5/2011 | Hunt | G06F 3/0481 |
| | | | 715/800 |
| 2011/0145753 A1* | 6/2011 | Prakash | G06F 3/0481 |
| | | | 715/783 |
| 2011/0163971 A1* | 7/2011 | Wagner | G06F 3/04817 |
| | | | 345/173 |
| 2012/0072866 A1* | 3/2012 | Imai | G06F 9/4443 |
| | | | 715/804 |
| 2012/0300090 A1* | 11/2012 | Aviv | G06K 9/00228 |
| | | | 348/222.1 |
| 2013/0246510 A1* | 9/2013 | Shimamoto | H04L 65/602 |
| | | | 709/203 |

* cited by examiner

DISPLAY CONTROL APPARATUS CAPABLE OF DISPLAYING LIST OF IMAGES CORRESPONDING TO CONTENTS, METHOD OF CONTROLLING THE DISPLAY CONTROL APPARATUS, AND STORAGE MEDIUM

BACKGROUND OF THE INVENTION

Field of the Invention

The present invention relates to a display control apparatus which is capable of displaying a list of images corresponding to respective contents, a method of controlling the display control apparatus, and a storage medium, and more particularly to display control performed when downloading a content list, such as an image list, and displaying the same.

Description of the Related Art

Generally, images (contents) obtained by an image pickup apparatus, such as a digital camera, as one of terminal apparatuses are posted to an image storage site on the Internet. In some cases, images to be posted are downloaded from a server apparatus on the Internet to another terminal apparatus (e.g. a tablet terminal) and are displayed in a list. Further, a display control method in which display of images is switched based on the extension of image files has been disclosed e.g. in Japanese Patent Laid-Open Publication No. 2009-81866.

In this method, when displaying a thumbnail image list of image files, information of an image type is displayed together with each associated thumbnail image. Further, when it is impossible to display an image, an image indicating that the image cannot be displayed is displayed in place of the associated thumbnail image.

In the display control method disclosed in Japanese Patent Laid-Open Publication No. 2009-81866, whether or not display of an image is possible is determined by discriminating a file format according to the extension of the image file, and when it is impossible to display the image, an image notifying the fact is displayed in place of the associated thumbnail image, as mentioned above. However, it is impossible to display an image list promptly according to the contents of image files.

SUMMARY OF THE INVENTION

The present invention provides a display control apparatus capable of promptly display a list of images according to the contents of contents files, such as image files, such that a user can quickly identify the images, a method of controlling the display control apparatus, and a storage medium.

In a first aspect of the present invention, there is provided a display control apparatus capable of causing a list of images corresponding to a plurality of respective contents to be displayed on a display unit, comprising an acquisition unit configured to acquire data items of the respective contents or reduced images corresponding to the respective contents, and a generation unit configured to generate a list screen using the data items or the reduced images acquired by the acquisition unit, wherein the generation unit generates the list screen using display objects predetermined in association with attributes of the contents, respectively, before the data items or the reduced images are acquired by the acquisition unit.

In a second aspect of the present invention, there is provided a display control apparatus capable of causing a list of images corresponding to a plurality of respective contents to be displayed on a display unit, comprising an acquisition unit configured to acquire data items of the respective contents or reduced images corresponding to the respective contents, a generation unit configured to generate a list screen using the data items or the reduced images acquired by the acquisition unit, and a determination unit configured to determine whether or not a time period required to acquire the images corresponding to the respective contents exceeds a predetermined time period, wherein the generation unit generates the list screen using the display objects, in a case where the determination unit determines that the time period required to acquire the images exceeds the predetermined time period, whereas generates the list screen using the data items or the reduced images acquired by the acquisition unit, without using the display objects, in a case where the determination unit determines that the time period required to acquire the image does not exceed the predetermined time period.

In a third aspect of the present invention, there is provided a server that manages a plurality of contents, comprising a communication unit configured to communicate with an external apparatus, a first transmission unit configured to transmit data items of the respective contents managed by the server or reduced images corresponding to the respective contents via the communication unit, and a second transmission unit configured to transmit display objects according to attributes of the respective contents via the communication unit, before transmitting the data items of the respective contents or the reduced images corresponding to the respective contents by the first transmission unit.

In a fourth aspect of the present invention, there is provided a method of controlling a display control apparatus capable of causing a list of images corresponding to a plurality of respective contents to be displayed on a display unit, comprising acquiring data items of the respective contents or reduced images corresponding to the respective contents, and generating a list screen using the data items or the reduced images acquired by said acquiring, wherein said generating includes generating the list screen using display objects predetermined in association with attributes of the contents, respectively, before the data items or the reduced images are acquired by said acquiring.

In a fifth aspect of the present invention, there is provided a method of controlling a display control apparatus capable of causing a list of images corresponding to a plurality of respective contents to be displayed on a display unit, comprising acquiring data items of the respective contents or reduced images corresponding to the respective contents, generating a list screen using the data items or the reduced images acquired by said acquiring, and determining whether or not a time period required to acquire the images corresponding to the respective contents exceeds a predetermined time period, wherein said generating includes generating the list screen using the display objects, in a case where said determining determines that the time period required to acquire the images exceeds the predetermined time period, whereas generating the list screen using the data items or the reduced images acquired by said acquiring, without using the display objects, in a case where said determining determines that the time period required to acquire the image does not exceed the predetermined time period.

In a sixth aspect of the present invention, there is provided a method of controlling a server that manages a plurality of contents, comprising communicating with an external apparatus, transmitting data items of the respective contents managed by the server or reduced images corresponding to the respective contents via said communicating, and transmitting display objects according to attributes of the respective contents via said communicating, before transmitting the data items of the respective contents or the reduced images corresponding to the respective contents by said transmitting.

In a seventh aspect of the present invention, there is provided a non-transitory computer-readable storage medium storing a computer-executable program for causing a computer to execute a method of controlling a display control apparatus capable of causing a list of images corresponding to a plurality of respective contents to be displayed on a display unit, wherein the method comprises acquiring data items of the respective contents or reduced images corresponding to the respective contents, and generating a list screen using the data items or the reduced images acquired by said acquiring, wherein said generating includes generating the list screen using display objects predetermined in association with attributes of the contents, respectively, before the data items or the reduced images are acquired by said acquiring.

In an eighth aspect of the present invention, there is provided a non-transitory computer-readable storage medium storing a computer-executable program for causing a computer to execute a method of controlling a display control apparatus capable of causing a list of images corresponding to a plurality of respective contents to be displayed on a display unit, wherein the method comprises acquiring data items of the respective contents or reduced images corresponding to the respective contents, generating a list screen using the data items or the reduced images acquired by said acquiring, and determining whether or not a time period required to acquire the images corresponding to the respective contents exceeds a predetermined time period, wherein said generating includes generating the list screen using the display objects, in a case where said determining determines that the time period required to acquire the images exceeds the predetermined time period, whereas generating the list screen using the data items or the reduced images acquired by said acquiring, without using the display objects, in a case where said determining determines that the time period required to acquire the image does not exceed the predetermined time period.

In a ninth aspect of the present invention, there is provided a non-transitory computer-readable storage medium storing a computer-executable program for causing a computer to execute a method of controlling a server that manages a plurality of contents, wherein the method comprises communicating with an external apparatus, transmitting data items of the respective contents managed by the server or reduced images corresponding to the respective contents via said communicating, and transmitting display objects according to attributes of the respective contents via said communicating, before transmitting the data items of the respective contents or the reduced images corresponding to the respective contents by said transmitting.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A description will now be given of a display control apparatus according to a first embodiment of the present invention. Note that in the following description, the display control apparatus controls display of images (e.g. still images or moving images) as contents.

Figure 1:
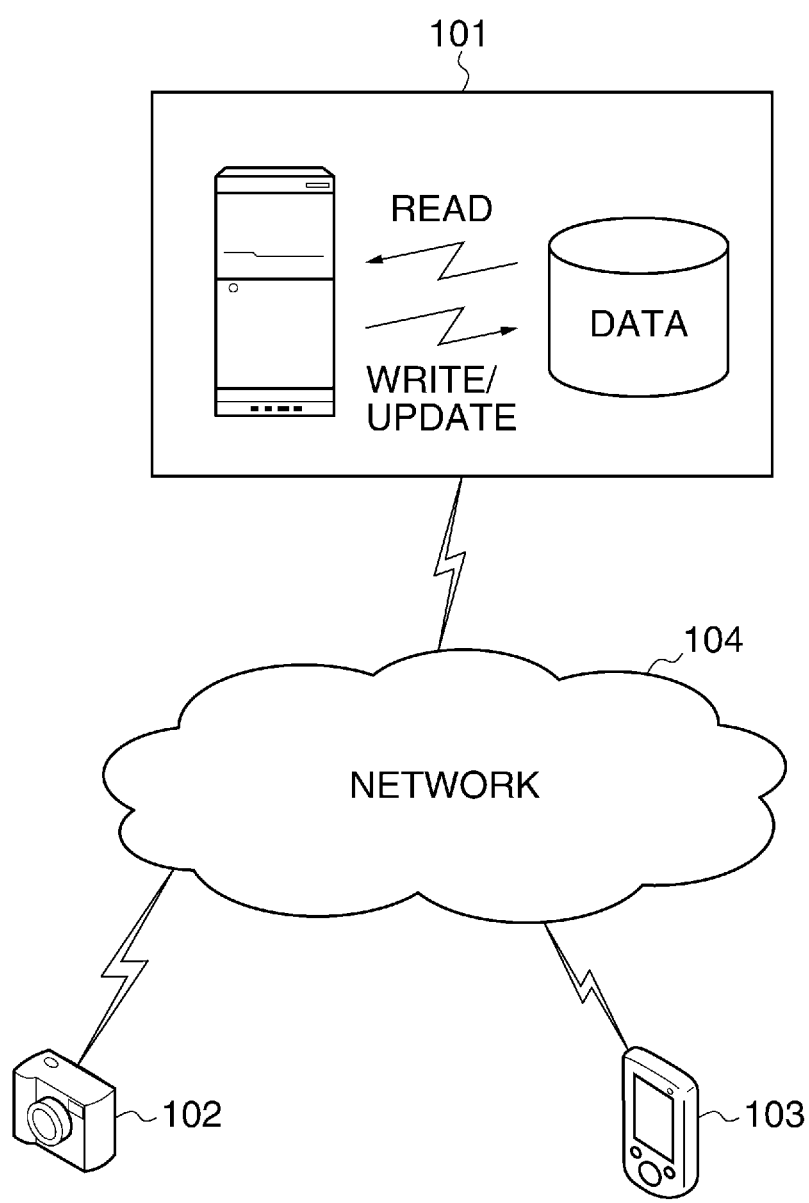
FIG. 1 is a diagram of the configuration of an image management system including a terminal apparatus equipped with a display control apparatus according to a first embodiment of the present invention.

FIG. 1 is a diagram of the configuration of an image management system including a terminal apparatus equipped with a display control apparatus according to the first embodiment.

In the image management system shown in FIG. 1, an image pickup apparatus 102, such as a digital camera, which is a terminal apparatus, is connected to a server apparatus 101 via a network 104 implemented e.g. by the Internet. Further, a terminal apparatus 103, such as a tablet terminal, is connected to the server apparatus 101 via the network 104, for example. In the example shown in FIG. 1, images picked up by the image pickup apparatus 102 are sent to the server apparatus 101 via the network 104, and the server apparatus 101 holds the images. On the other hand, the terminal apparatus 103 accesses the server apparatus 101 via the network 104 to sequentially acquire images stored in the server apparatus 101 and display the images as an image list (contents list) as will be described hereinafter.

Figure 2:
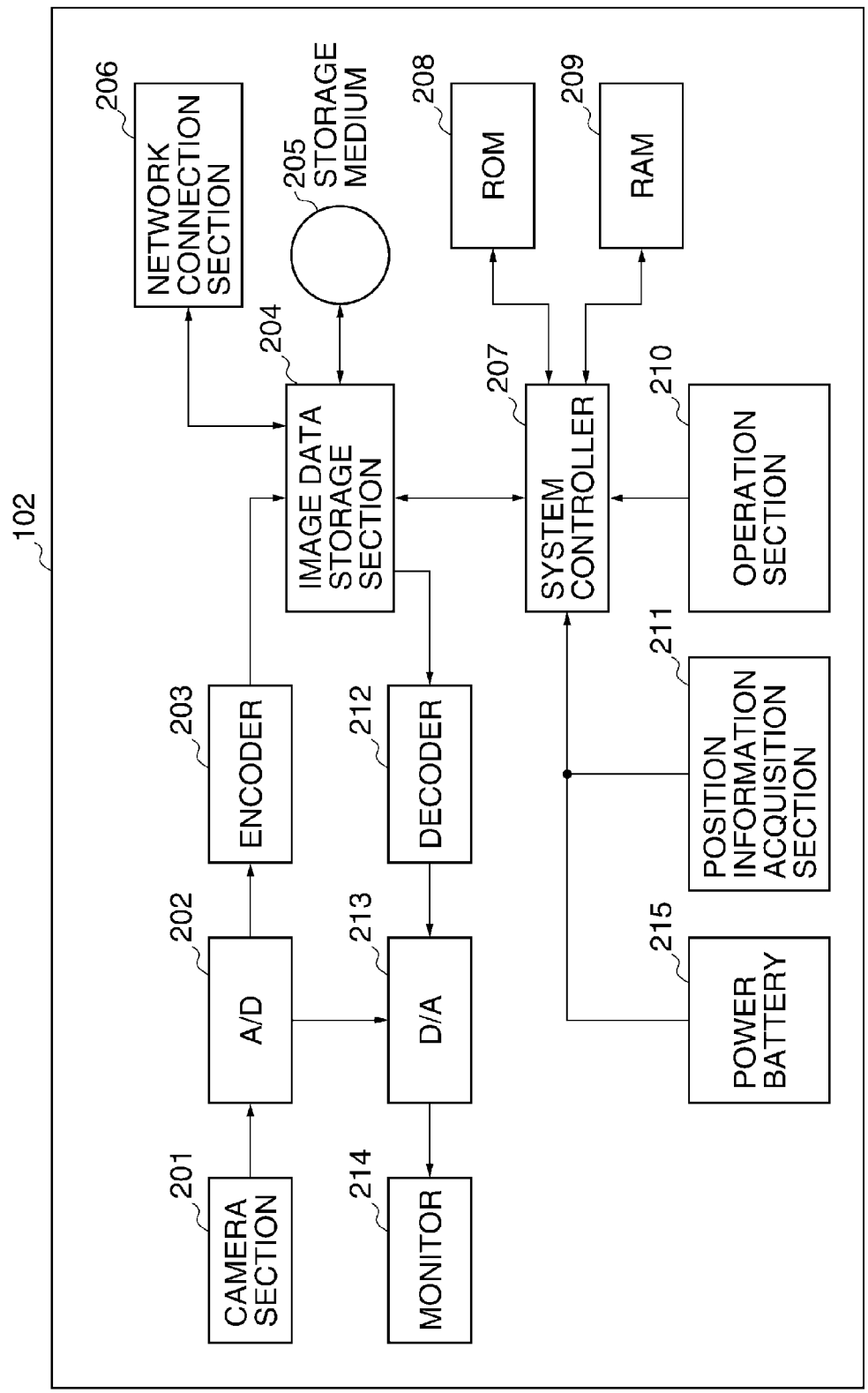
FIG. 2 is a block diagram of an image pickup apparatus as the terminal apparatus appearing in FIG. 1.

FIG. 2 is a block diagram of the image pickup apparatus 102 appearing in FIG. 1.

The image pickup apparatus 102 has a camera section 201, and the camera section 201 picks up an object image (optical image) via a photographic lens and outputs an electric signal (analog image signal) corresponding to the optical image. An analog-to-digital converter 202 receives the analog image signal and converts the analog image signal to a digital image signal (hereinafter also referred to as image data).

An encoder 203 compresses and encodes the image data into compression-encoded image data (for example, when the image data is still image data, the encoder 203 compresses and encodes the still image data by an encoding method, such as the JPEG method). An image data storage section 204 generates a file (image file) of the compression-encoded image data and stores the image file in a storage medium 205. The storage medium 205 can be randomly accessed.

A network connection section 206 transmits the image file to the server apparatus 101 via the network 104 (see FIG. 1). A system controller 207 is provided with a microcomputer to control the overall operation of the image pickup apparatus 102. A ROM 208 stores not only control programs for operating the system controller 207 but also image pickup settings files and various kinds of data. A RAM 209 is used as a work area for the system controller 207, and has a load area for control programs.

An operation section 210 includes an operation panel and a remote controller, and a user operates the operation section 210 to thereby input various kinds of data and commands. A position information acquisition section 211 is implemented e.g. by a GPS receiver. The position information acquisition section 211 calculates a current position of the image pickup apparatus 102 based on GPS information received from a GPS satellite and generates position information indicative of the current position. Note that the position information acquisition section 211 may be externally connected to the image pickup apparatus 102.

A decoder 212 receives the compression-encoded image data from the image data storage section 204 and decodes the compression-encoded image data into the image data. A digital-to-analog converter 213 converts the image data to an analog image signal and displays an image corresponding to the analog image signal on a monitor (display section) 214. Note that a power battery 215 supplies the system controller 207 with electric power required to drive the image pickup apparatus.

As mentioned hereinabove, in the present embodiment, the control programs for controlling the image pickup apparatus 102 are stored in the ROM 208. However, the control programs may be stored in the storage medium 205 implemented e.g. by a memory card. Alternatively, the control programs may be acquired by the image pickup apparatus 102 via the network 104.

Further, the ROM 208 stores server information and user information. The server information, which includes address information of the server apparatus 101, is used by the network connection section 206 so as to access the server apparatus 101. The user information is used for user authentication executed before the image pickup apparatus 102 is used. The image pickup apparatus 102 accesses the server apparatus 101 based on the address information included in the server information, and the server apparatus 101 executes user authentication based on the user information.

Figure 3:
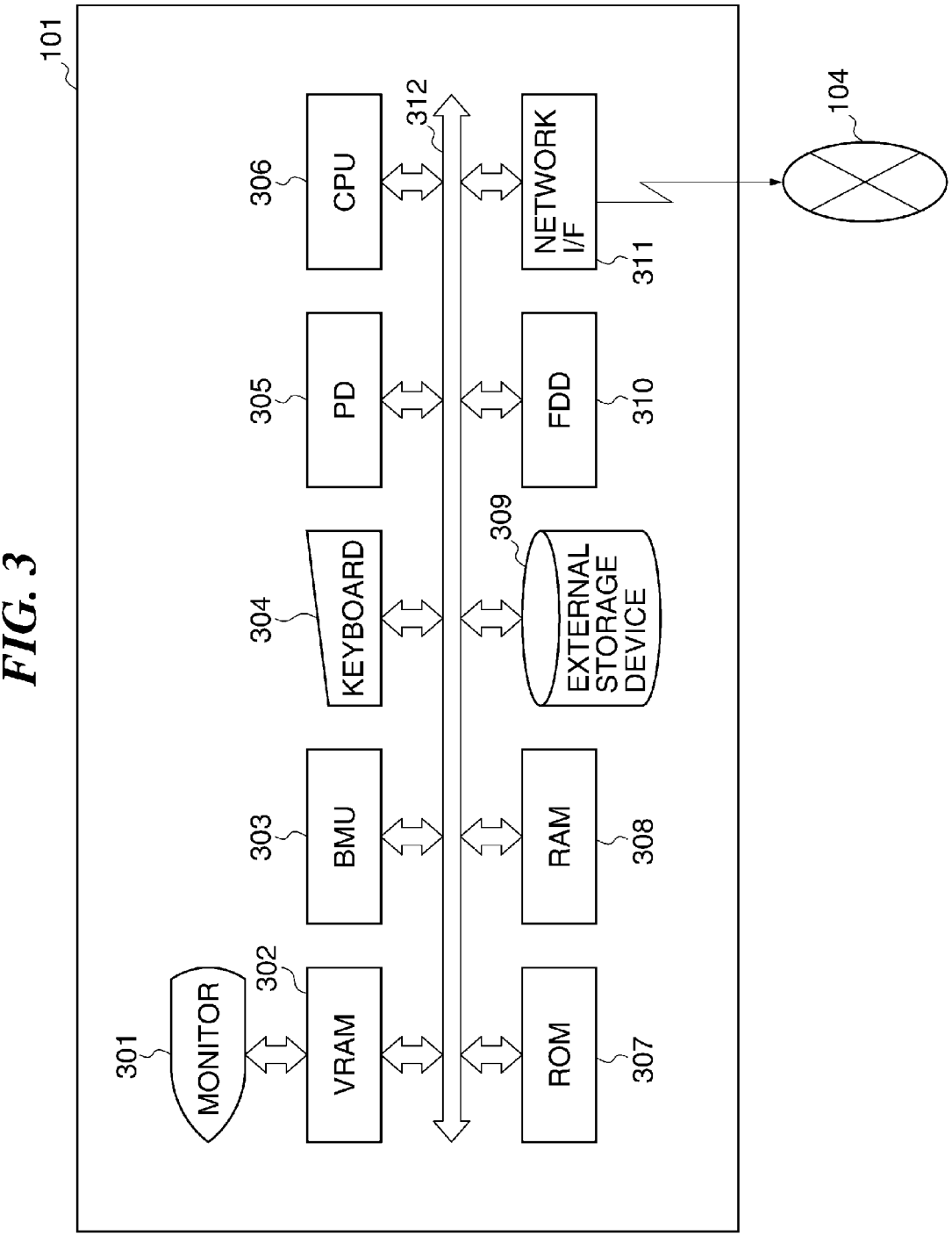
FIG. 3 is a block diagram of a server apparatus appearing in FIG. 1.

FIG. 3 is a block diagram of the server apparatus 101 appearing in FIG. 1.

The server apparatus 101 shown in FIG. 3 is comprised of a monitor 301, a VRAM 302, a bit move unit (BMU) 303, a keyboard 304, a pointing device (PD) 305, a CPU 306, a ROM 307, a RAM 308, an external storage device 309, a flexible disk drive (FDD) 310, and a network interface (I/F) 311. On the monitor 301 is displayed data (including images) stored in the server apparatus 101, for example. An image to be displayed on the monitor 301 is rendered in the VRAM 302. The image data rendered in the VRAM 302 is transferred to the monitor 301 according to predetermined rules and is displayed on the monitor 301.

The bit move unit 303 controls data transfer between memories (e.g. between the VRAM 302 and another memory) and data transfer between a memory and each input/output (I/O) device (e.g. the network interface 311), for example. The keyboard 304 has various keys for use in inputting characters and the like.

The pointing device 305 is used to point to an icon, a menu, or other information displayed on the monitor 301, for example. The CPU 306 controls the overall operation of the server apparatus 101 based on the control programs stored in the ROM 307, the external storage device 309, or the flexible disk drive 310. The ROM 307 stores control programs, data, and so forth. The RAM 308 includes a work area for the CPU 306, a data save area for use in error handling, a load area for control programs, and so forth.

The external storage device 309 stores control programs executed by the server apparatus 101 and data. The flexible disk drive 310 controls access to a flexible disk typified e.g. by a floppy (registered trade mark) disk. The network interface 311 provides interface for connection to the network 104. A CPU bus 312 includes an address bus, a data bus, and a control bus.

Although in the illustrated example, the control programs are provided to the CPU 306 from the ROM 307, the external storage device 309, or the flexible disk drive 310, they may be provided from an external information processing apparatus (not shown) through the network 104 via the network interface 311.

Figure 4:
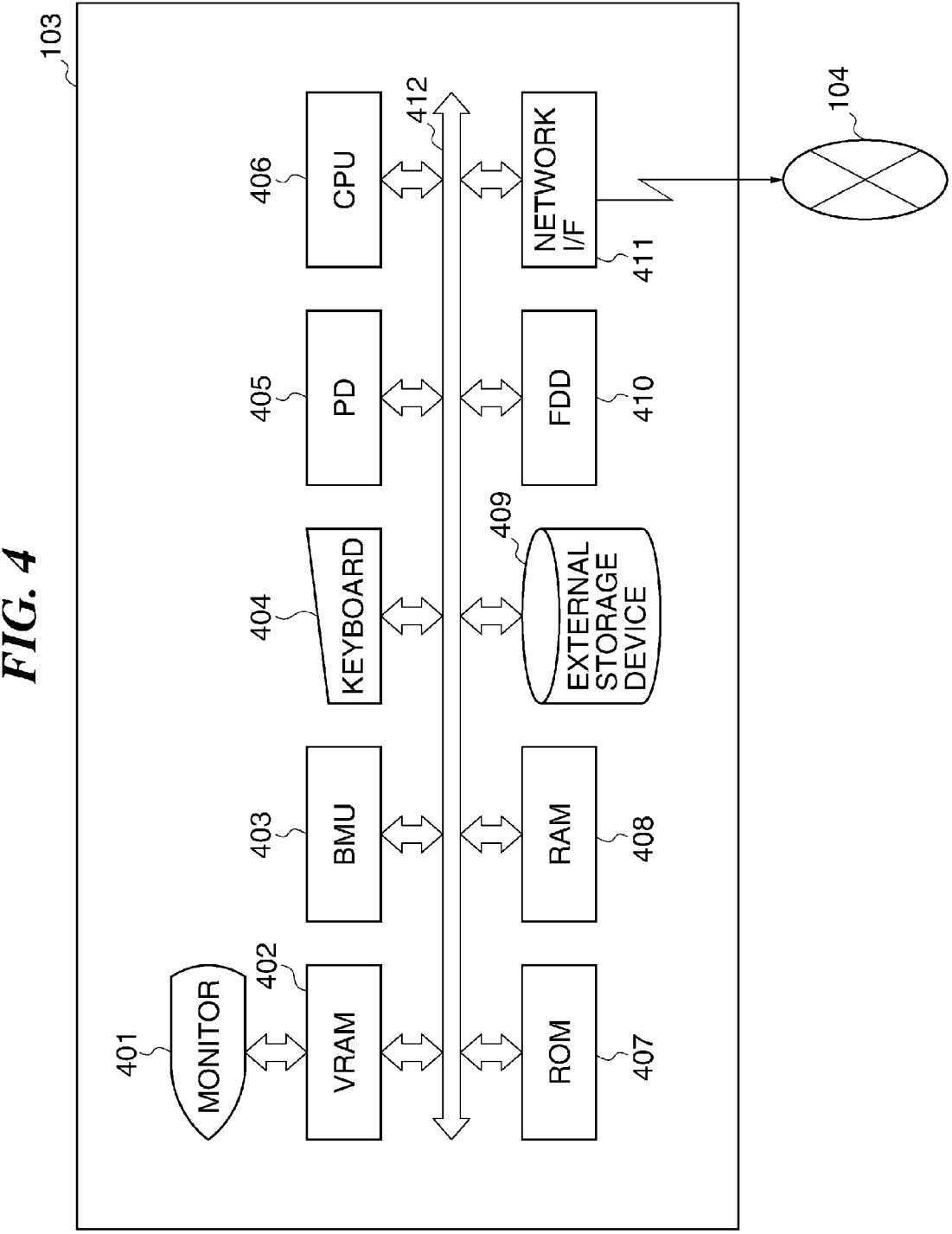
FIG. 4 is a block diagram of the terminal apparatus appearing in FIG. 1.

FIG. 4 is a block diagram of the terminal apparatus 103 appearing in FIG. 1.

The terminal apparatus 103 shown in FIG. 4 is comprised of a monitor 401, a VRAM 402, a bit move unit (BMU) 403, a keyboard 404, a pointing device (PD) 405, a CPU 406, a ROM 407, a RAM 408, an external storage device 409, a flexible disk drive (FDD) 410, and a network interface 411. The VRAM 402, the bit move unit 403, the keyboard 404, the pointing device 405, the CPU 406, the ROM 407, the RAM 408, the external storage device 409, the flexible disk drive 410, and the network interface 411 are interconnected by a CPU bus 412.

The components of the terminal apparatus 103 shown in FIG. 4 are the same as those of the server apparatus 101 shown in FIG. 3, and therefore description thereof is omitted.

Figure 5:
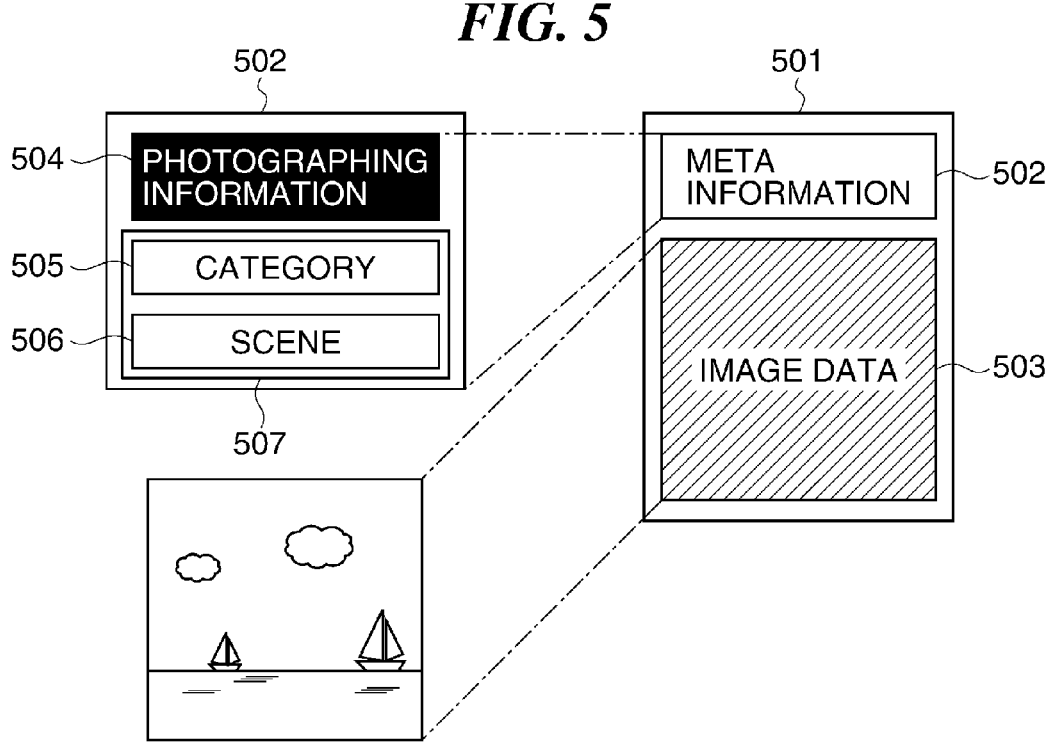
FIG. 5 is a diagram illustrating an example of image data obtained through photographing by the image pickup apparatus shown in FIG. 2 and an image file including image information accompanying the image data.

FIG. 5 is a diagram illustrating an example of image data obtained through photographing by the image pickup apparatus 102 shown in FIG. 2 and an image file including image information accompanying the image data.

The image file illustrated in FIG. 5 is stored in the storage medium 205 by the image data storage section 204. The image file, denoted by reference numeral 501, is comprised of image data (compression-encoded image data in the present embodiment) 503 representing an image and meta information (image information) 502 accompanying the image data 503. The meta information 502 is comprised of photographing information 504 including photographed date and time, a category (i.e. classification information) 505 indicative of a category of the image, and a scene (i.e. photographed scene information) 506 indicative of a photographed scene.

For example, when an image represents a human being, "portrait" is stored in the category 505, while when an image represents a scene, "landscape" is stored in the category 505. The category 505 and the scene 506 form an associating attribute 507 which provides group information indicative of contents of the image.

Figure 6:
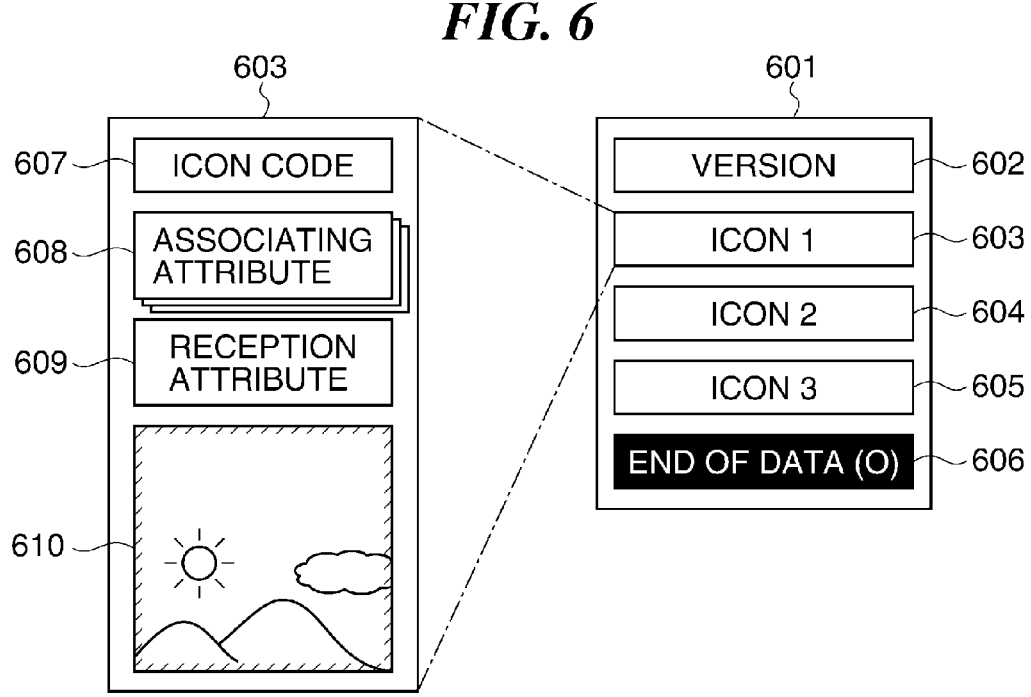
FIG. 6 is a diagram illustrating an example of icon management information managed by the server apparatus shown in FIG. 3.

FIG. 6 is a diagram illustrating an example of icon management information managed by the server apparatus 101 shown in FIG. 3.

In the server apparatus 101, the icon management information illustrated in FIG. 6 is stored e.g. in the external storage device 309. The illustrated icon management information, denoted by reference numeral 601, is comprised of icon information items 603 to 605 and a version 602 for managing the version of the icon information items 603 to 605. Although in the illustrated example, the three icon information items 603 to 605 are shown, the number of icon information items is not limited to three, but it suffices that the icon management information includes at least one icon information item. An end of data 606 is recorded at a location following the final icon information item, and "0" is input in the end of data 606.

The icon information item 603 is comprised of an icon code 607 for identifying an icon, associating attributes 608 indicative of which category 505 and which scene 506 the icon is associated with, a reception attribute 609 indicative of an environment where the terminal apparatus is placed, and icon data 610.

The icon data 610 may be either a small-sized JPEG image or a bitmap image. Further, the image may be generated from a natural picture, or alternatively the image may be an illustration or an animated image. However, data size should be sufficiently small so as not to take much processing time even when images are displayed in a list.

Note that similar to the icon information item 603, each of the other icon information items 604 and 605 is comprised of an icon code, associating attributes, a reception attribute, and icon data.

The reception attribute 609 is used when icon data is switched from one item to another according to geographical and cultural conditions under which the terminal apparatus 103 is operated. For example, when the terminal apparatus 103 is located in a region close to the Arctic Circle, the server apparatus 101 refers to the reception attribute 609 and sends snowfield icon data associated with the reception attribute 609 as a landscape to the terminal apparatus 103 in place of grassland icon data. In short, the reception attribute 609 is used to determine whether or not an icon information item corresponds to the location of the terminal apparatus 103 on the receiving side.

Figure 7:
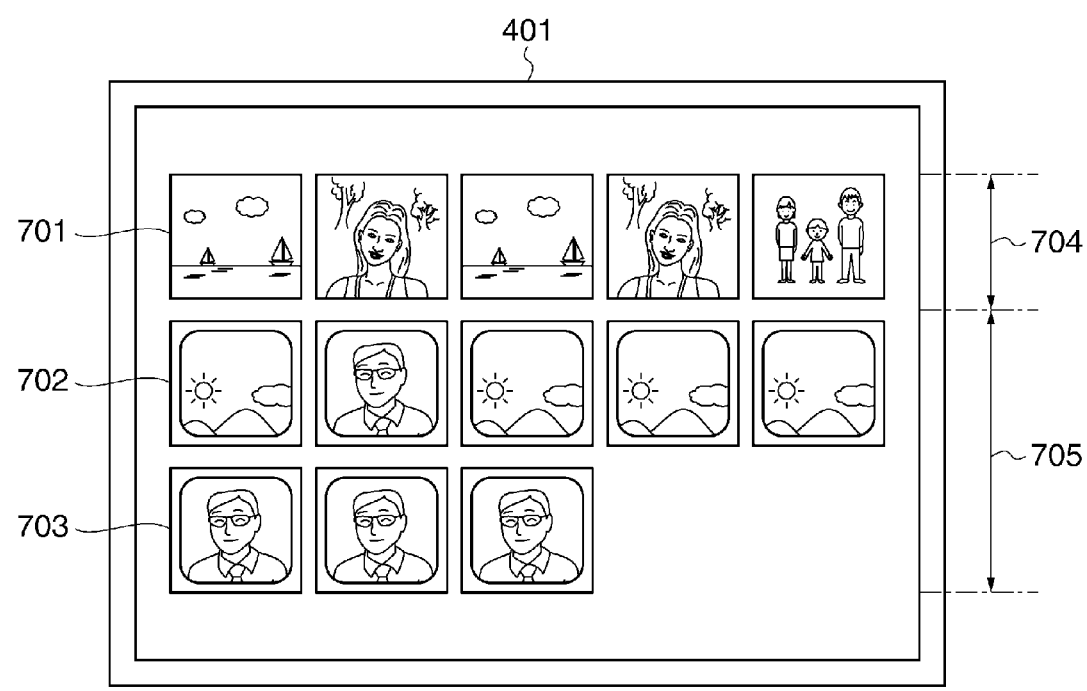
FIG. 7 is a view illustrating an example of an image list displayed on a monitor of the terminal apparatus shown in FIG. 4.

FIG. 7 is a view illustrating an example of an image list displayed on the monitor 401 of the terminal apparatus 103 shown in FIG. 4.

In the terminal apparatus 103, thumbnail images of icons are displayed on the monitor 401 together with thumbnail images which are reduced images of respective actual images, in a list. In the example shown in FIG. 7, reduced actual image reading, described hereinafter, has been completed for a range 704, and reduced actual images including an image 701 are displayed as thumbnail images.

On the other hand, reduced actual image reading has not been completed for a range 705, and therefore icons 702 and 703 associated with the category 505 and the scene 506 are displayed. In the extension-based switching in Japanese Patent Laid-Open Publication No. 2009-81866, it is possible to perform discrimination of a data format which indicates whether an image is a still image or a moving image and whether the image is a compressed image or a non-compressed image, but it is impossible to discriminate a photographed scene which indicates contents of the image.

However, in the present embodiment, the server apparatus 101 extracts information concerning contents of an image from meta information and reflects the extracted information on an icon displayed on the terminal apparatus 103, as described hereinafter, so that it is possible to provide the user with an image list displayed in a manner enabling intuitive and easy image discrimination.

Figure 8:
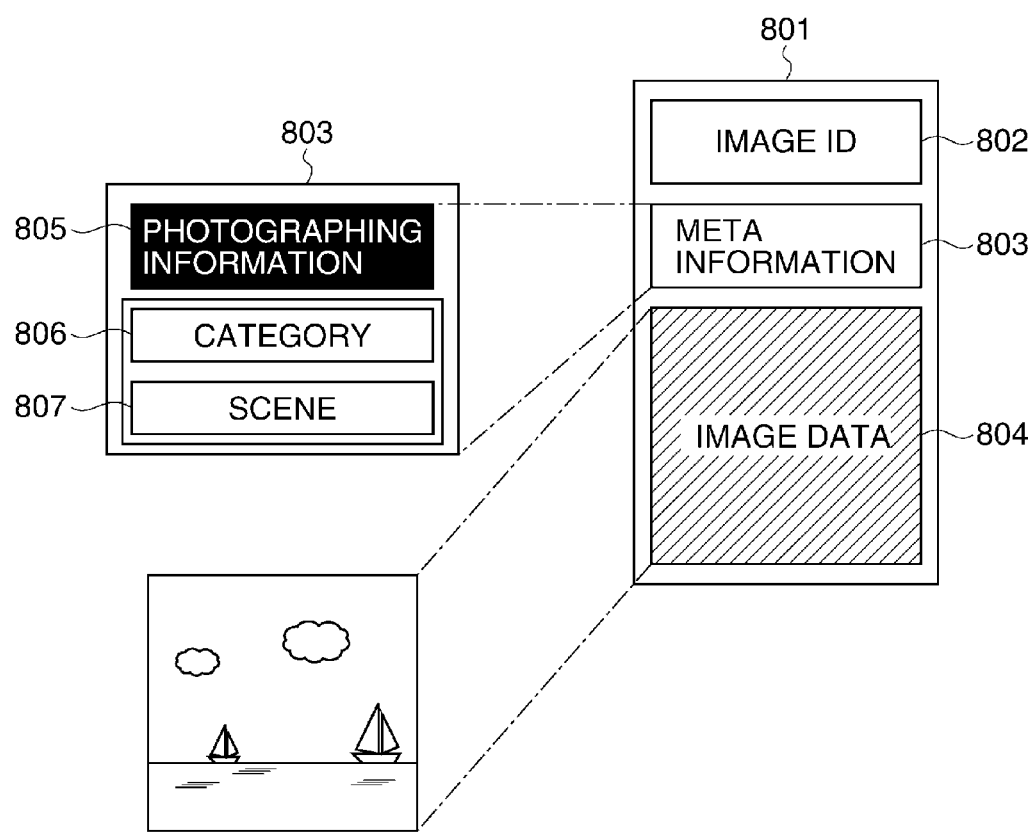
FIG. 8 is a diagram illustrating image management information managed by the server apparatus shown in FIG. 3.

FIG. 8 is a diagram illustrating an example of image management information managed by the server apparatus 101 shown in FIG. 3.

In the server apparatus 101, the image management information illustrated in FIG. 8 is stored e.g. in the external storage device 309. The image management information 801 includes an image ID 802 unique to each image file and an image file described with reference to FIG. 5.

Note that in FIG. 8, meta information and image data (i.e. compression-encoded image data) of the image file are denoted by reference numerals 803 and 804, respectively. Further, photographing information, a category, and a scene are denoted by reference numerals 805, 806, and 807, respectively.

Figure 9:
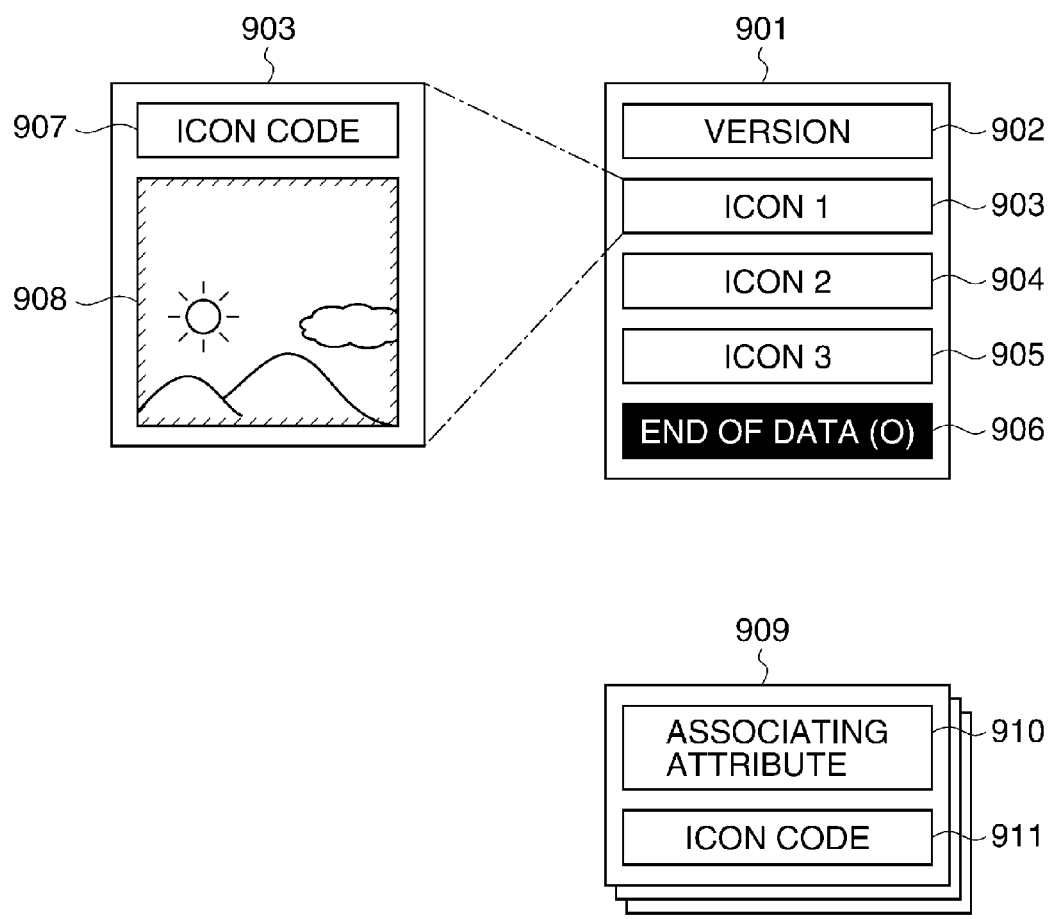
FIG. 9 is a diagram useful in explaining reception and management of icon management information by the terminal apparatus shown in FIG. 4.

FIG. 9 is a diagram useful in explaining reception and management of the icon management information 601 by the terminal apparatus 103 shown in FIG. 4. In the present embodiment, the server apparatus 101 sends the icon management information 601 to the terminal apparatus 103 in response to a request from the same.

When the terminal apparatus 103 receives the icon management information 601 from the server apparatus 101, the CPU 406 of the terminal apparatus 103 generates icon management information 901 corresponding to the icon management information 601 and stores the icon management information 901 e.g. in the external storage device 409. Further, the CPU 406 generates image-icon associating attribute information 909, described hereinafter, according to the icon management information 601 and stores the image-icon associating attribute information 909 in the external storage device 409.

Similar to the icon management information 601, the icon management information 901 includes a version 902 for managing icon information items 903 to 905 and the versions of the respective icon information items 903 to 905, and a data end 906 having "0" input therein is at a location following the final icon information item 905.

The icon information item 903 is comprised of an icon code 907 for identifying an icon and icon data 908. Note that similar to the icon information item 903, each of the other icon information items 904 and 905 have an icon code and icon data.

The image-icon associating attribute information 909 indicates a correspondence between an image and an icon (display object) associated therewith. The image-icon associating attribute information 909 is comprised of a associating attribute 910 and an icon code 911. The image-icon attribute information indicates which icon code 911 is to be displayed according to the category 505 and the scene 506 of the associating attribute 910.

Figure 10:
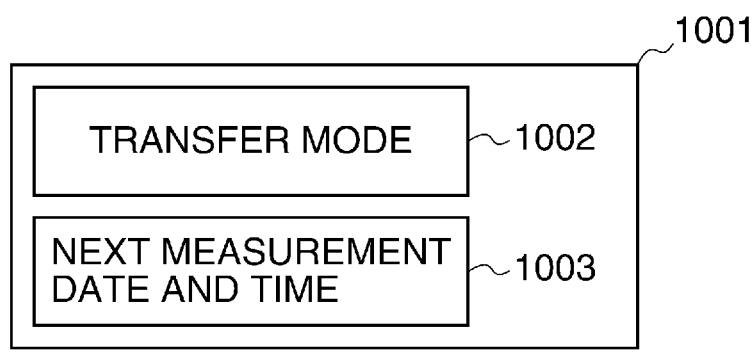
FIG. 10 is a diagram illustrating an example of communication management information for managing a transfer mode in which thumbnail images are transferred between the server apparatus shown in FIG. 3 and the terminal apparatus shown in FIG. 4.

FIG. 10 is a diagram illustrating an example of communication management information for managing a transfer mode in which thumbnail images are transferred between the server apparatus 101 shown in FIG. 3 and the terminal apparatus 103 shown in FIG. 4.

The communication management information 1001 illustrated in FIG. 10 is stored e.g. in the external storage device 409 provided in the terminal apparatus 103. The communication management information 1001 is comprised of a transfer mode 1002 and a next measurement date and time 1003. The transfer mode 1002 is set to either an actual image mode or an icon mode. In the actual image mode, an image obtained by reducing an actual image is displayed on the monitor 401 as a thumbnail image.

On the other hand, in the icon mode, first, an icon is displayed on the monitor 401, and then, when a thumbnail image formed by reducing an actual image is received, the thumbnail image of the actual image is displayed in place of the icon. Particularly in a mobile environment, a communication speed can change from moment to moment, and therefore in the terminal apparatus 103, the communication speed is measured at every predetermined measurement period. The measurement period is sent from the server apparatus 101 to the terminal apparatus 103, and the CPU 506 determines the next measurement date and time 1003 based on the measurement period.

Figure 11:
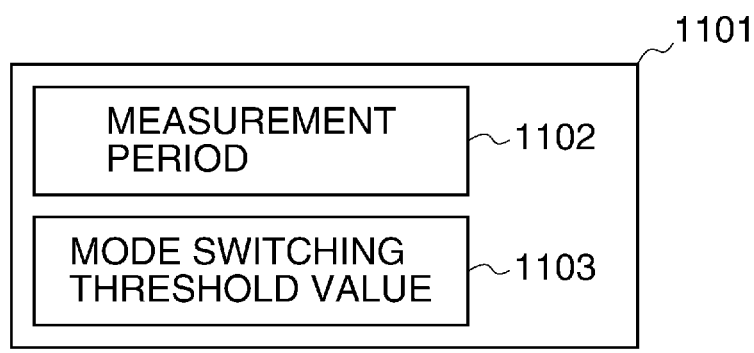
FIG. 11 is a diagram useful in explaining a set of communication conditions for determining a next measurement date and time included in the communication management information illustrated in FIG. 10.

FIG. 11 is a diagram useful in explaining a set of communication conditions for determining the next measurement date and time 1003 included in the communication management information 1001 illustrated in FIG. 10.

The set of communication conditions 1101 illustrated in FIG. 11 is recorded in the external storage device 309 provided in the server apparatus 101. The set of communication conditions 1101 is comprised of a measurement period 1102 indicating a repetition period of measurement of the communication speed and a mode switching threshold value 1103 for switching the transfer mode 1002. The set of communication conditions 1101 is sent from the server apparatus 101 to the terminal apparatus 103. As described hereinafter, when the communication speed exceeds the mode switching threshold value 1103, the CPU 406 sets the transfer mode to the actual image mode, and when the communication speed becomes lower than the mode switching threshold value 1103, the CPU 406 switches the transfer mode to the icon mode.

Figure 12:
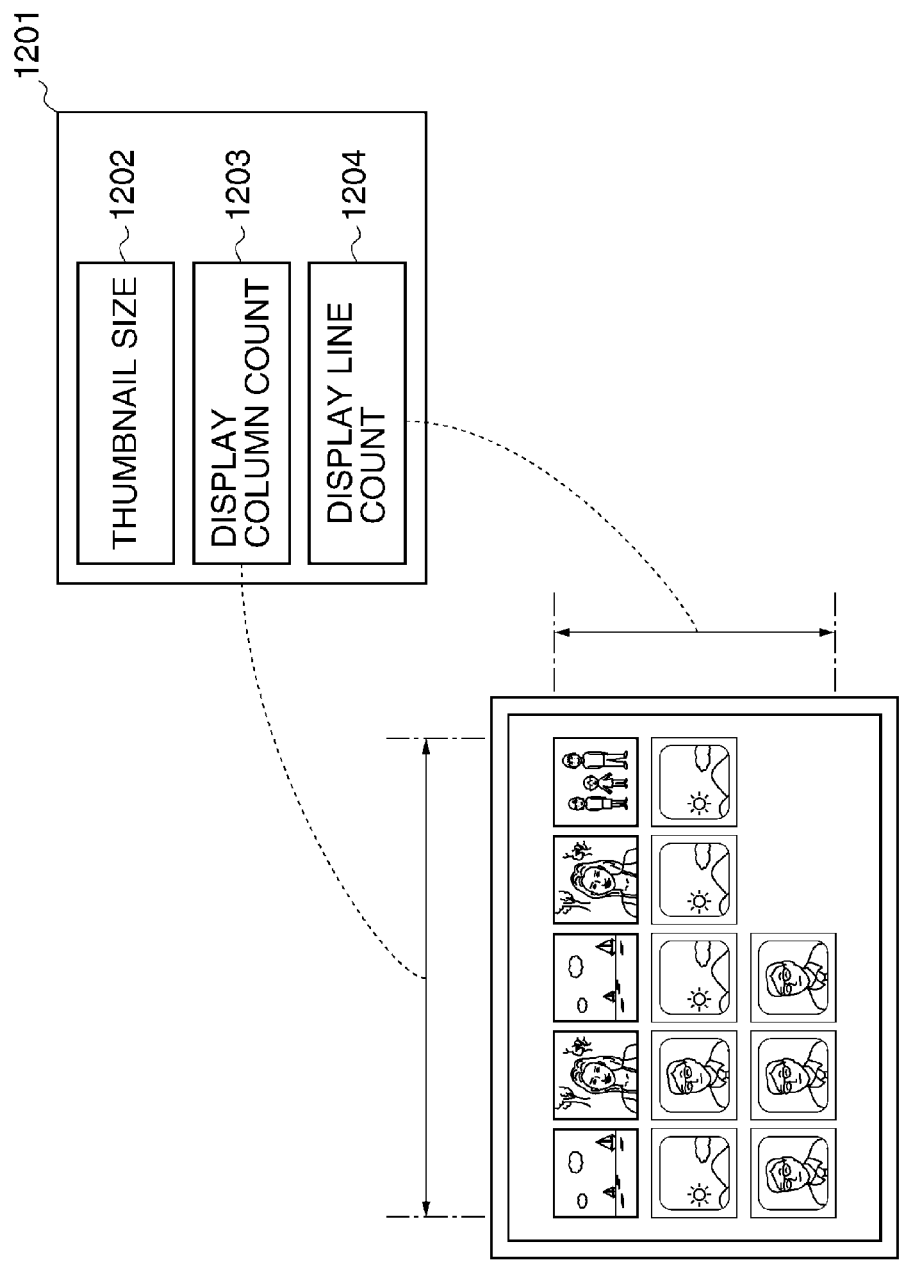
FIG. 12 is a diagram useful in explaining a set of display conditions for displaying thumbnails of an image list on the monitor of the terminal apparatus shown in FIG. 4.

FIG. 12 is a diagram useful in explaining an example of a set of display conditions for displaying a list of images as a list of thumbnails on the monitor 401 of the terminal apparatus 104 shown in FIG. 4.

The set of display conditions 1201 illustrated in FIG. 12 is stored e.g. in the external storage device 409 provided in the terminal apparatus 103. The set of display conditions 1201 is comprised of a thumbnail size 1202, a display column count 1203, and a display line count 1204. The thumbnail size 1202 is determined based on the size of the monitor 401, the display column count 1203, and the display line count 1204. In the present embodiment, the CPU 406 determines the thumbnail size.

Figure 13:
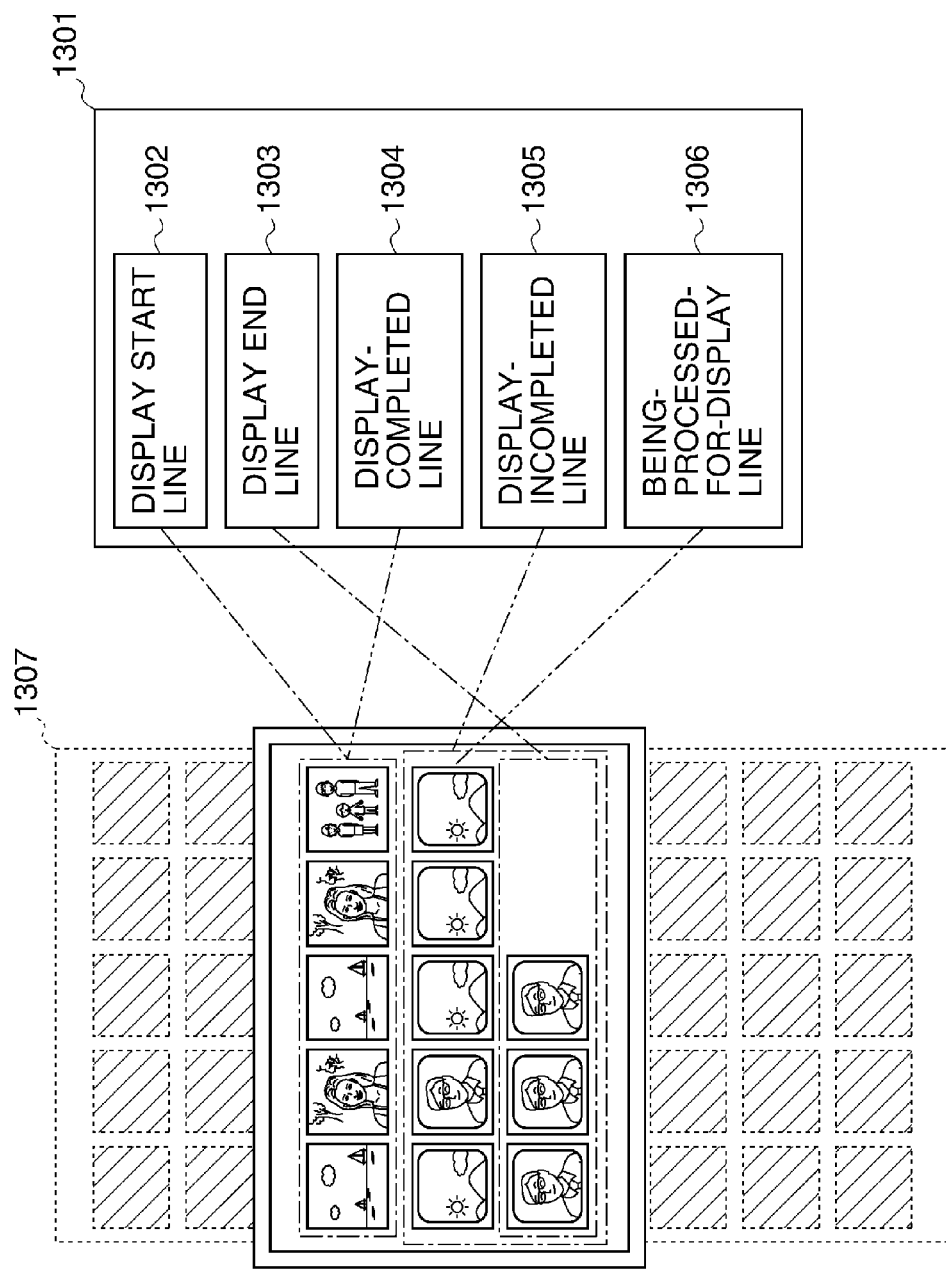
FIG. 13 is a diagram illustrating an example of display management information for managing a state of display of the thumbnails of the image list on the monitor of the terminal apparatus shown in FIG. 4.

FIG. 13 is a diagram illustrating an example of display management information for managing a state in which an image list is displayed as a list of thumbnails on the monitor 401 of the terminal apparatus 103 shown in FIG. 4.

The display management information 1301 is stored in the server apparatus 101. For example, the display management information 1301 is recorded in an image storage area defined in the external storage device 309 provided in the server apparatus 101. The display management information 1301 is comprised of a display start line 1302 and a display end line 1303, which indicate where in an image group 1307 currently displayed images are located, a display-completed line (/display-completed lines) 1304, display-incompleted lines (/a display-incompleted line) 1305, and a being-processed-for-display line 1306.

In the illustrated example, as the position of an image in the image group 1307 is lower, its photographed date and time is more recent. As illustrated in the image group 1307, the image storage area provided in the server apparatus 101 can store a larger number of images than can be displayed in the display area of the monitor 401 at a time. In such a case, a portion of the image group 1307 defined by the display start line 1302 and the display end line 1303 is displayed on the terminal apparatus 1303, as will be described hereinafter.

The display-completed line(s) 1304 indicate(s) a portion of the image group 1307 where display of the thumbnails of actual images has been completed, and the display-incompleted line(s) 1305 indicate(s) a portion of the image group 1307 where the thumbnails of icons are being displayed and hence the thumbnails of actual images have not been displayed yet. Further, the being-processed-for-display line 1306 indicates a portion of the image group 1307 where the thumbnails of actual images are currently being processed for display.

When the user clicks or touches the upper end of the monitor 401 of the terminal apparatus 1303, the CPU 406 scrolls the image list downward. On the other hand, when the user clicks the lower end of the monitor 401, the CPU 406 scrolls the image list upward.

Note that the above-mentioned scroll operation is only an example of an operation for changing an area where images are displayed in a list, the image list may be scrolled by other operations.

Figure 14:
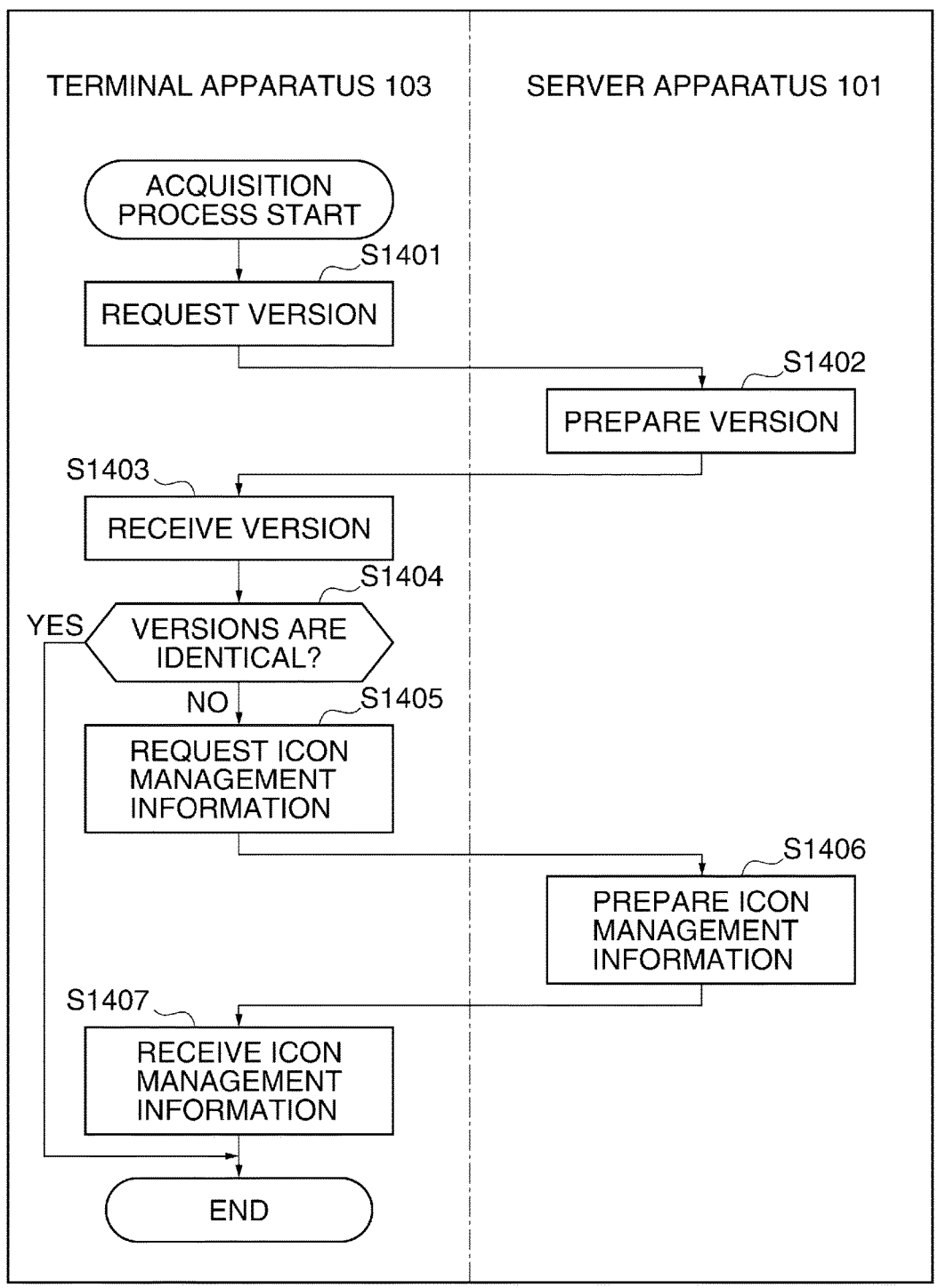
FIG. 14 is a flowchart of a process executed when the terminal apparatus shown in FIG. 4 acquires the icon management information from the server apparatus shown in FIG. 3.

FIG. 14 is a flowchart of a process executed when the terminal apparatus 103 shown in FIG. 4 acquires the icon management information 601 from the server apparatus 101 shown in FIG. 3. Note that one part of the illustrated process by the terminal apparatus 103 is executed under the control of the CPU 406, while the other part of the same by the server apparatus 101 is executed under the control of the CPU 306.

When the acquisition process for acquiring the icon management information 601 is started, the CPU 406 of the terminal apparatus 103 requests the server apparatus 101 via the network interface 411 to send the version 602 included in the icon management information 601 (step S1401), and the CPU 306 of the server apparatus 101 extracts the version 602 from the icon management information 601 recorded e.g. in the external storage device 309 and prepares for transmission of the version 602 to the terminal apparatus 103 (step S1402).

In the terminal apparatus 103, upon receipt of the version 602 (step S1403), the CPU 406 makes a comparison between the version 902 recorded in the external storage apparatus 409 and the received version 602 to thereby determine whether or not the two versions are identical (step S1404). If the two versions are identical (YES to the step S1404), the CPU 406 determines that icon data to be updated does not exist in the server apparatus 101, followed by terminating the acquisition process for acquiring the icon management information.

On the other hand, if the version 902 and the version 602 are different from each other (NO to the step S1404), the CPU 406 requests the server apparatus 101 via the network interface 411 to send the icon management information 601 (step S1405). In response to this request, the CPU 306 of the server apparatus 101 acquires the icon management information 601 from the external storage device 309 and prepares for transmission of the icon management information 601 (step S1406). Then, the CPU 306 of the server apparatus 101 sends the icon management information 601 to the terminal apparatus 103.

In the terminal apparatus 103, when the icon management information 601 is received (step S1407), the CPU 406 updates the icon information items 903 to 905 of the icon management information 901 according to the icon management information 601 and overwrites the icon code 607 associated with the associating attribute 608 identical to the associating attribute 910 of the image-icon associating attribute information 909, on the icon code 911 of the same, followed by terminating the acquisition process.

Thus, in the terminal apparatus 103, the icon code 911 is selected according to the associating attribute 910, and an icon identified by the icon code 911 is displayed as the thumbnail of the icon, in the image list. When icon information is acquired from the server apparatus 101 as described above, an icon group is set in the terminal apparatus 103, and therefore it is not required to read an icon on an image-by-image basis for the image list.

Figure 15:
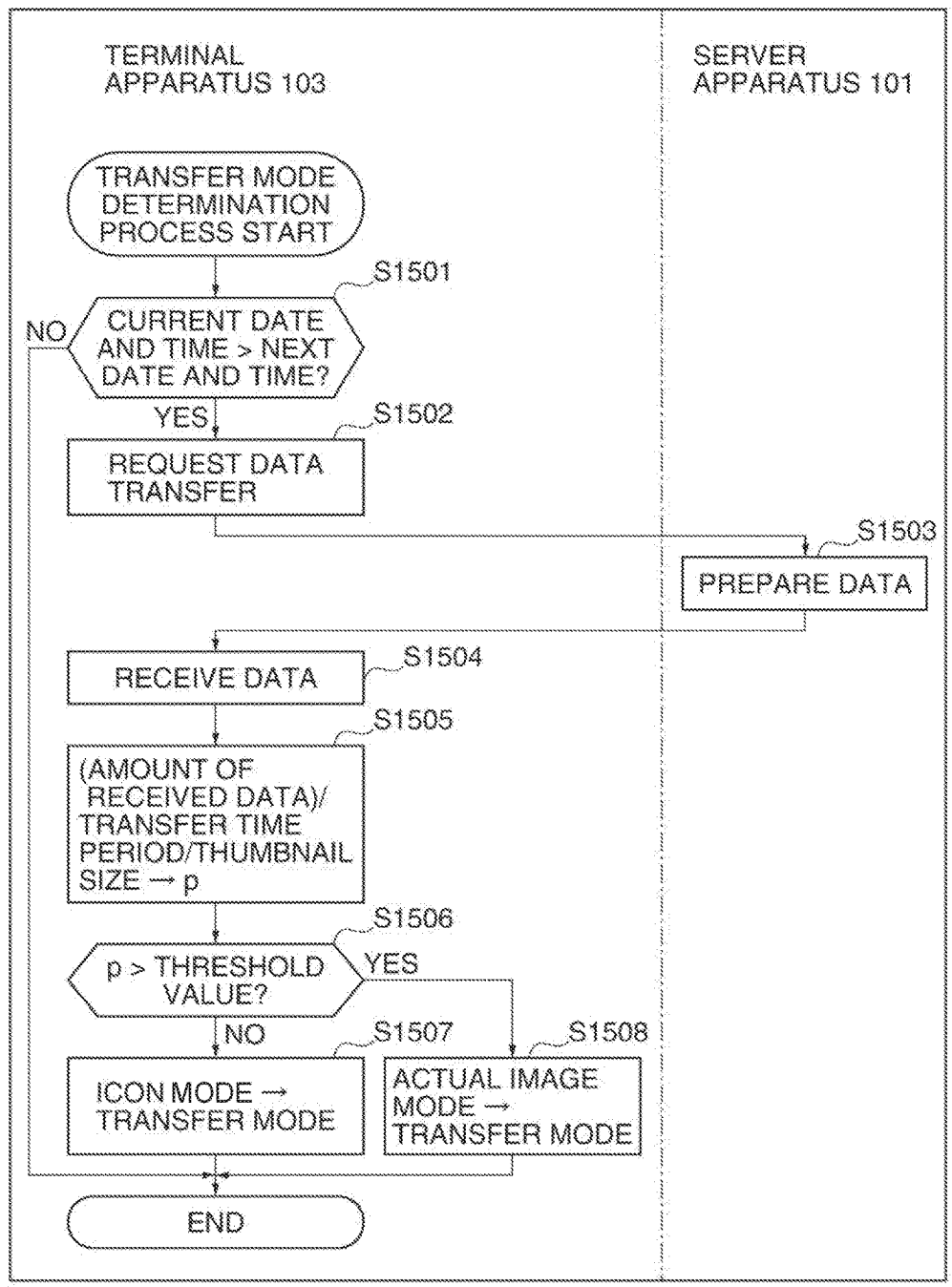
FIG. 15 is a flowchart of a transfer mode determination process for determining a transfer mode of data transfer between the server apparatus shown in FIG. 3 and the terminal apparatus shown in FIG. 4.

FIG. 15 is a flowchart of a transfer mode determination process for determining a transfer mode 1002 of data transfer between the server apparatus 101 shown in FIG. 3 and the terminal apparatus 103 shown in FIG. 4. Note that similar to the process in FIG. 14, the transfer mode determination process in FIG. 15 is executed under the control of the CPU 306 of the server apparatus 101 and the CPU 406 of the terminal apparatus 103.

When the transfer mode determination process is started, the CPU 406 of the terminal apparatus 103 determines whether or not the current date and time is past the next measurement data and time (next date and time) 1003 recorded in the communication management information 1001 (i.e. current date and time>next date and time) (step S1501). If current date and time≤next date and time (NO to the step S1501), the CPU 406 terminates the transfer mode determination process.

On the other hand, if current date and time>next date and time (YES to the step S1501), the CPU 406 requests the server apparatus 101 via the network interface 411 to transfer data so as to measure the communication speed (line speed) (step S1502). In response to this data transfer request, the CPU 306 of the server apparatus 101 prepares predetermined data (step S1503) and sends the data to the terminal apparatus 103 via the network interface 311.

In the terminal apparatus 103, upon receipt of the data (step S1504), the CPU 406 substitutes a variable "p" for "the amount of received data/transfer time period/thumbnail size)", i.e. the number of thumbnail images that can be transferred per unit time (step S1505). Here, a time period from a time point when the data transfer request is sent to a time point when the data is received from the server apparatus 101 is used as the transfer time period, for example.

Then, the CPU 406 determines whether or not the variable p is larger than the mode switching threshold value 1103 (step S1506). If the variable p is not larger than the mode switching threshold value 1103 (p≤threshold value)(NO to the step S1506), the CPU 406 sets the transfer mode 1002 to the icon mode (step S1507), followed by terminating the transfer mode determination process.

On the other hand, if the variable p is larger than the mode switching threshold value 1103 (p>threshold value) (YES to the step S1506), the CPU 406 sets the transfer mode 1002 to the actual image mode (step S1508), followed by terminating the transfer mode determination process.

Figure 16:
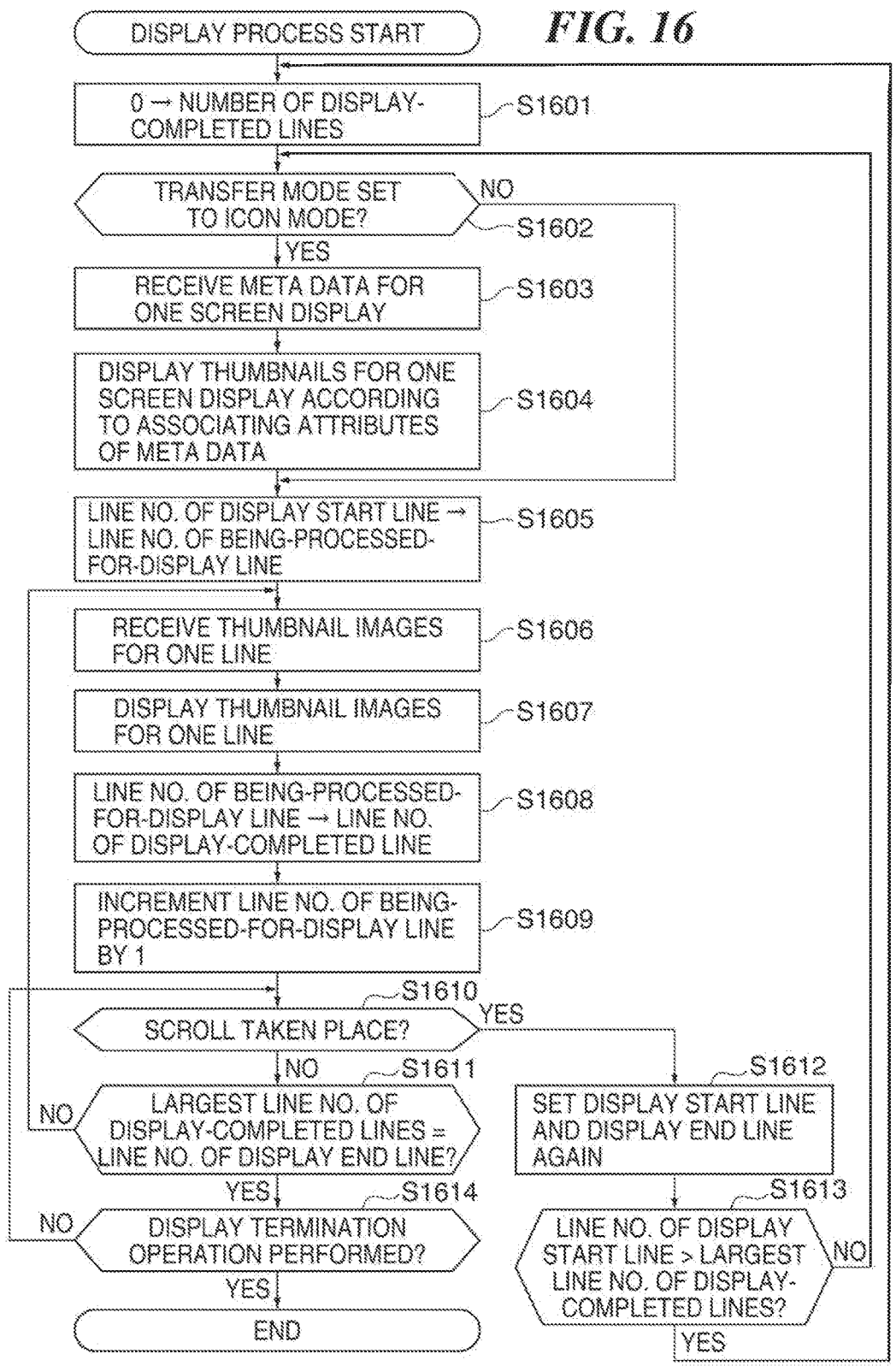
FIG. 16 is a flowchart of a display process executed by the terminal apparatus shown in FIG. 4 so as to receive thumbnail images and image data from the server apparatus shown in FIG. 3 and display these on the monitor.

FIG. 16 is a flowchart of a display process executed by the terminal apparatus 103 shown in FIG. 4 so as to receive thumbnail images and image data from the server apparatus 101 shown in FIG. 3 and display these on the monitor 401. Note that the illustrated display process is executed under the control of the CPU 406 of the terminal apparatus 103.

In the terminal apparatus 103, when the display process is started, the CPU 406 initializes the number of display-completed lines 1304 to "0" (step S1601). Then, the CPU 406 determines whether or not the transfer mode 1002 is the icon mode (step S1602). If the transfer mode 1002 is the icon mode (YES to the step S1602), the CPU 406 receives a plurality of meta data items 501 corresponding to respective image data items to be displayed on one screen of the monitor 401 (step S1603).

Next, the CPU 406 acquires the icon information item 903 corresponding to the associating attribute 507, according to the associating attribute 910 and the icon code 911, and displays a plurality of thumbnails (icon images) to be displayed in one screen of the monitor 401 (step S1604). Then, the CPU 406 sets the line number of the being-processed-for-display line 1306 to the line number of the display start line 1302 of the image group 1307 (step S1605).

If the transfer mode is not the icon mode (NO to the step S1602), i.e. if the transfer mode is the actual image mode, the CPU 406 directly proceeds to the step S1605.

Then, the CPU 406 receives thumbnail images (reduced actual images) for one line in the image group 1307 from the server apparatus 101 via the network interface 411 (step S1606). Thereafter, the CPU 406 displays the thumbnails (reduced actual images) of the one line on the monitor 401 in place of the icon images displayed so far (step S1607).

Next, the CPU 406 sets the line number of the being-processed-for-display line 1306 as a line number of the display-completed lines 1304 of the image group 1307 (step S1608). Then, the CPU 406 increments the line number of the being-processed-for-display line 1306 by one (step S1609). Then, the CPU 406 determines whether or not a scroll operation (e.g. a scroll operation in the normal direction) by the user has taken place (step S1610).

If no scroll operation has taken place (NO to the step S1610), the CPU 406 determines whether or not the largest line number of the display-completed lines 1304 is equal to the line number of the display end line 1303 (step S1611). In other words, the CPU 406 determines whether or not a thumbnail image list associated with all the actual images to be displayed at a time have been displayed in the display area of the monitor 401.

If the largest line number of the display-completed lines 1304 is equal to the line number of the display end line 1303 (YES to the step S1611), the CPU 406 determines whether or not display termination operation has been performed by the user (step S1614). If the display termination operation has not been performed (NO to the step S1614), the process returns to the step S1610, wherein the CPU 406 determines whether or not a scroll operation has taken place. If the display termination operation has been performed (YES to the step S1614), the CPU 406 terminates the display process. On the other hand, if it is determined in the step S1611 that the largest line number of the display-completed lines 1304 is not equal to the line number of the display end line 1303 (NO to the step S1611), the CPU 406 returns to the step S1606 and receives thumbnail images (reduced actual images) for one line of the being-processed-for-display line from the server apparatus 101.

If a scroll operation has taken place (YES to the step S1610), the CPU 406 sets the display start line 1302 and the display end line 1303 again such that they indicate respective new portions (lines of images) in the image group 1307 after the scroll operation (step S1612). Then, the CPU 406 determines whether or not the line number of the display start line 1302 is larger than the largest line number of the display-completed lines 1304, i.e. if the display start line 1302 is located forward (downward) of the display-completed lines 1304 in display order position (step S1613).

If the line number of the display start line 1302 is larger than the largest line number of the display-completed lines 1304 (YES to the step S1613), i.e. if an area where display of actual images has been completed wholly disappears from the monitor 401, the CPU 406 determines that display has not been completed for any line of images to be displayed yet, and returns to the step S1601, wherein the CPU 406 sets the number of display-completed lines 1304 to "0".

On the other hand, if the line number of the display start line 1302 is not larger than the largest line number of the display-completed lines 1304, i.e. if any line number of the display-completed lines 1304 is at or after the display start line 1302 in display order position (NO to the step S1613), the CPU 406 determines that there still exists at least one display-completed line 1304 that is being displayed. Then, the CPU 406 returns the process to the step S1602 without setting the number of display-completed lines 1304 to "0", and determines whether or not the transfer mode is the icon mode.

In the example shown in FIG. 16, the transfer mode 1002 is switched according to the line speed, and in this case, the line speed may be measured during image transfer, or alternatively, may be measured not during image transfer, but during free time.

As described above, according to the first embodiment, the contents of respective actual images can be identified with ease before completion of display of a list of thumbnail images of the actual images, and therefore, it is possible to view the images promptly in a situation where the line speed (transfer speed) is unstable (e.g. under a wireless network for mobile terminals). In short, it is possible to promptly display a list of contents according to the information on contents files, such as image files.

Next, a description will be given of an image management system which employs a terminal apparatus equipped with a display control apparatus, according to a second embodiment of the present invention. The configuration of the image management system of the second embodiment and processes executed in the image management system are the same as those described with reference to FIGS. 1 to 15, and hence description thereof is omitted while denoting the same components by the same reference numerals. The second embodiment is distinguished from the first embodiment in a display process which will be described hereafter with reference to FIG. 17.

Figure 17:
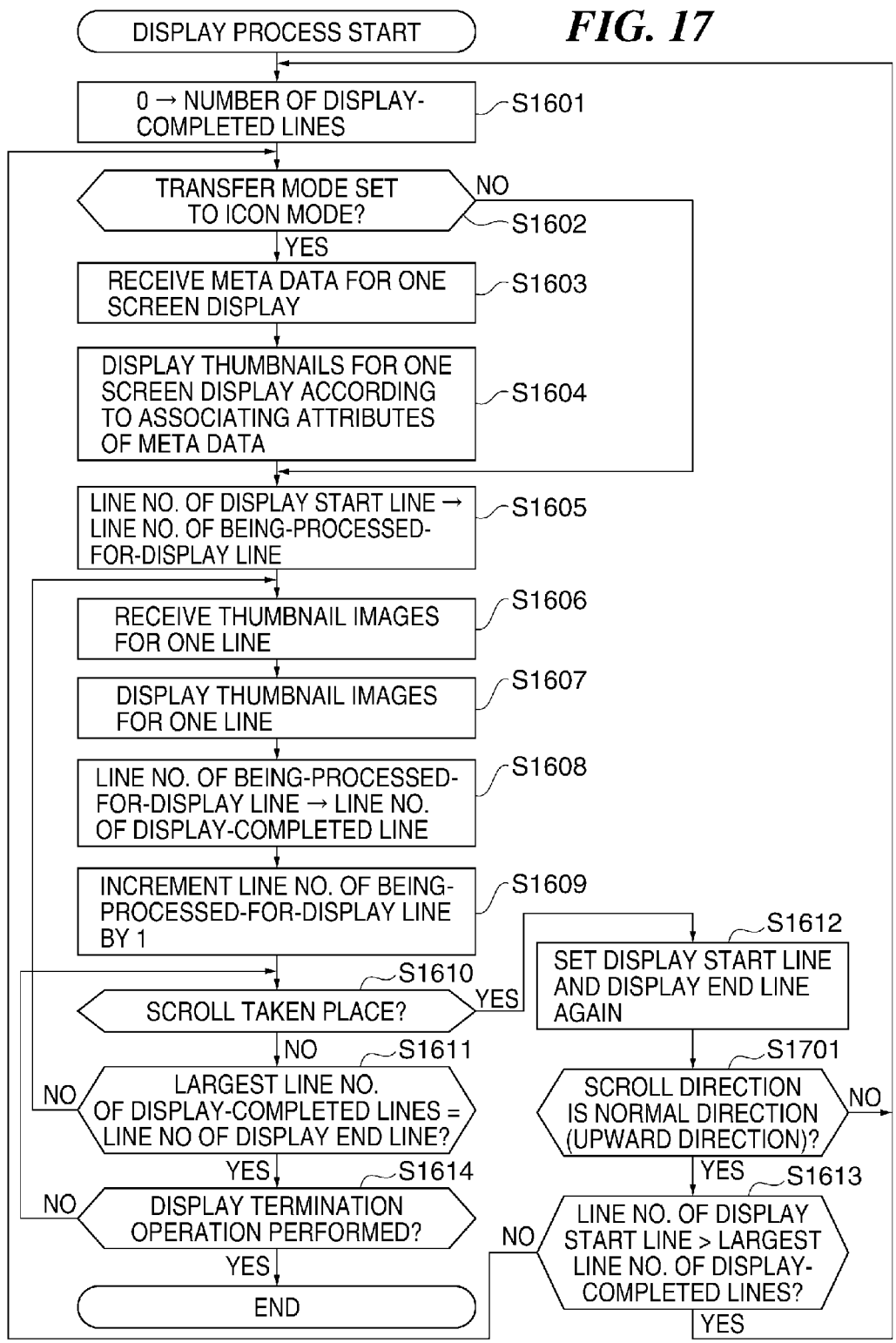
FIG. 17 is a flowchart of a display process executed by a terminal apparatus equipped with a display control apparatus according to a second embodiment of the present invention.

FIG. 17 is a flowchart of the display process executed by the terminal apparatus 103 in the image management system including the display control apparatus according to the second embodiment.

Although in the display process described with reference to FIG. 16, it is assumed that the user performs a scroll operation in the normal direction, in this display process, it is also assumed that the user performs a scroll operation in the reverse direction so as to view images older in photographing time.

The display process in FIG. 17 is executed under the control of the CPU 406 of the terminal apparatus 103. The same steps as those of FIG. 16 are denoted by the step numbers, and description thereof is omitted.

In the step S1612, the CPU 406 sets the display start line 1302 and the display end line 1303 again such that they indicate respective new portions (lines of images) in the image group 1307 after the scroll operation, and then the CPU 406 determines whether or not the direction of the scroll operation performed by the user is the normal direction (upward direction) (step S1701). If the direction of the scroll operation is the normal direction (YES to the step S1701), the process proceeds to the step S1613, wherein the CPU 406 determines whether or not the line number of the display start line 1302 is larger than the largest line number of the display-completed lines 1304, i.e. whether or not the display start line 1302 is located forward (downward) of the display-completed lines 1304 in display order position.

On the other hand, if the direction of the scroll operation is the reverse direction (NO to the step S1701), the process returns to the step S1601, wherein the CPU 406 sets the number of the display-completed lines 1304 to "0". By doing this, it is possible to carry out processing smoothly even in a case where scroll operations are performed in both normal and reverse directions e.g. in the order of the reverse direction, the normal direction, and then the reverse direction.

Although in the above-described first and second embodiments, icon display is switched according to a category and a scene mode extracted from the meta information 502, it is also possible to use date and time data included in the photographing information 504.

In this case, if the date and time data included in the photographing information 504 indicates night (e.g. time from 6 p.m. to 5 a.m.), the CPU 406 sets the color of the background of an associated thumbnail of an icon to dark blue. On the other hand, if the date and time data included in the photographing information 504 indicates day (e.g. time from 5 a.m. to 6 p.m.), the CPU 406 sets the color of the background of an associated thumbnail of the icon to light blue.

By thus changing the background of the thumbnail of an icon according to date and time when photographing took place, as described above, the user becomes capable of easily and quickly discriminating whether the photographing was performed during day or during night.

In the above-described embodiment, the display form of an icon is changed according to photographing conditions (e.g. a scene, a portrait, a night view, etc.). However, the configuration may be, for example, such that human information indicative of whether or not a human being exists in an image is added to the attribute information, whereby when displaying a list of icons, if the attribute information indicates existence of a human being, a mark for enabling recognition of existence of a human is added to an associated icon displayed.

Further, the icon may be displayed with a mark which is added thereto using, as attribute information, position information, such as GPS information, so as to enable identification of a photographed position (location) of the image, according to whether the photographed location was close to a photographer's house or far from the photographer's house by a predetermined distance or more, or whether the photographed location was inside or outside the photographer's own country.

As described above, according to the present embodiment, when images are to be displayed in a list and it is determined that it takes longer than a predetermined time period to acquire an image, a predetermined icon (display object) is displayed on the monitor (display section) in place of the image, so that it is possible to promptly display a list of images that can be quickly identified by the user. Note that illustrations may be used in place of icons.

Although in the above-described embodiments, thumbnail images are displayed in a list on the terminal apparatus 103, the present invention can be similarly applied to a case where thumbnail images are displayed in a list on the image pickup apparatus 102.

Further, although in the above-described embodiments, in a case where an area to be displayed as a list screen is scrolled, icons of respective contents to be displayed on the display area at a time are acquired, and then associated image data items are acquired, this is not limitative.

For example, the configuration may be such that all icon images are once made displayable without determining which portion of a group of contents is to be displayed (is in the display area), and data items of thumbnail images of actual images of contents which are scrolled into the display area are sequentially acquired. In this case, processing for acquiring icon images corresponding to the display area is not executed, but it is only required to use icon images which are once generated according to the attributes of all images, when generating an image list, and then, acquire image data items corresponding to the display area to replace the icon images by the acquired image data items, respectively.

This configuration enables a user to perform a scroll operation while viewing a list of icons to thereby quickly check images associated with the icons.

In the above-described embodiment, images are assumed as contents. However, the contents are not necessarily limited to the images, but they may be files of documents and programs. Further, although in the embodiment, the description is given of a case where thumbnails of reduced images of images are acquired from the server apparatus, the invention may be applied to a case where files themselves of images, documents and programs are acquired.

Although in the above-described embodiment, the CPU 406 of the terminal apparatus 103 determines the transfer mode as the actual image mode or the icon mode, in advance, according to the number of thumbnail images that can be transferred per unit time, this is not limitative, but the CPU 306 of the server apparatus 101, which is requested to send thumbnail images, may determine, based on the number of the requested thumbnail images or a time period required to send them, whether or not to send reduced images of actual images or icons.

As is apparent from the above description, in the example shown in FIG. 4, at least the CPU 406, the monitor 401, the VRAM 402, the external storage device 409, and the network interface 411 form the display control apparatus. The CPU 406 functions as a determination unit, and the CPU 406 and the VRAM 402 function as a generation unit.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-140612 filed Jul. 4, 2013 which is hereby incorporated by reference herein in its entirety.

What is claimed is:

1. A display control apparatus capable of causing a list of images corresponding to a plurality of respective contents to be displayed on a display unit, comprising:
a processor; and
a memory having stored thereon instructions that when executed by the processor, cause the processor to:
acquire attributes of the respective contents and, after acquisition of the attributes of the respective contents, receive thumbnail images corresponding to the respective contents; and
generate a list screen using the received thumbnail images,
wherein the list screen is generated before the reception of thumbnail images by using temporary display objects predetermined in association with the acquired attributes of the contents, respectively, and by replacing the temporary display objects in the list screen using the received thumbnail images.

2. The display control apparatus according to claim 1, wherein the contents are still images or moving images, and the list screen is generated using the received thumbnail images associated with the respective still images or the respective moving images.

3. The display control apparatus according to claim 1, wherein the temporary display objects are illustrations or icons.

4. The display control apparatus according to claim 1, wherein each of the contents has added thereto, as attribute information, at least one of a photographing condition under which an associated one of the images was photographed, a photographed date and time, classification information, and photographed scene information of a photographed scene where the associated image was photographed, and
wherein said processor differentiates the temporary display objects according to the attribute information.

5. The display control apparatus according to claim 4, wherein the memory further includes stored instructions that when executed by the processor, cause the processor to store correspondence between the attribute information associated with each content and an associated one of the temporary display objects.

6. The display control apparatus according to claim 1, wherein in a case where any of the contents has human information added thereto, when displaying the temporary display object associated therewith in place of the thumbnail image corresponding thereto, said processor adds a mark indicating whether or not a human being exists, to the temporary display object.

7. The display control apparatus according to claim 1, wherein in a case where each of the contents has position information added thereto, when displaying the temporary display object associated therewith in place of the thumbnail image corresponding thereto, said processor changes a display form of the temporary display object according to the position information.

8. A display control apparatus capable of causing a list of images corresponding to a plurality of respective contents to be displayed on a display unit, comprising:
a processor; and
a memory having stored thereon instructions that when executed by the processor, cause the processor to:
acquire attributes of the respective contents and, after acquisition of the attributes of the respective contents, receive thumbnail images corresponding to the respective contents; and
generate a list screen using the received thumbnail images; and
determine whether or not a time period required to receive the thumbnail images corresponding to the respective contents exceeds a predetermined time period,
wherein the list screen is generated before the reception of thumbnail images by using temporary display objects and by replacing the temporary display objects in the list screen using the received thumbnail images, in a case where said processor determines that the time period required to receive the thumbnail images exceeds the predetermined time period, whereas said processor generates the list screen using the received thumbnail images, without using the temporary display objects, in a case where said processor determines that the time period required to receive the thumbnail images does not exceed the predetermined time period.

9. The display control apparatus according to claim 8, wherein the display control apparatus is connected to a server apparatus that manages the thumbnail images, via a network, and
wherein said processor uses a transfer time period required to transfer the thumbnail images from the server apparatus to the display control apparatus, as the time period required to receive the thumbnail images.

10. The display control apparatus according to claim 8, wherein said processor uses information on a number of thumbnail images that can be transferred per unit time, as the time period required to receive the thumbnail images.

11. A method of controlling a display control apparatus capable of causing a list of images corresponding to a plurality of respective contents to be displayed on a display unit, comprising:
acquiring attributes of the respective contents and, after acquisition of the attributes of the respective contents, receiving thumbnail images corresponding to the respective contents; and
generating a list screen using the received thumbnail images,
wherein said generating includes generating the list screen before the reception of thumbnail images by using temporary display objects predetermined in association with the acquired attributes of the contents, respectively, and by replacing the temporary display objects in the list screen using the received thumbnail images.

12. A method of controlling a display control apparatus capable of causing a list of images corresponding to a plurality of respective contents to be displayed on a display unit, comprising:
acquiring attributes of the respective contents and, after acquisition of the attributes of the respective contents, receiving thumbnail images corresponding to the respective contents;
generating a list screen using the received thumbnail images; and
determining whether or not a time period required to receive the thumbnail images corresponding to the respective contents exceeds a predetermined time period,
wherein said generating includes generating the list screen before the reception of thumbnail images by using temporary display objects and by replacing the temporary display objects in the list screen using the received thumbnail images, in a case where said determining determines that the time period required to receive the thumbnail images exceeds the predetermined time period, whereas said generating includes generating the list screen using the received thumbnail images, without using the temporary display objects, in a case where said determining determines that the time period required to receive the thumbnail images does not exceed the predetermined time period.

13. A non-transitory computer-readable storage medium storing a computer-executable program for causing a computer to execute a method of controlling a display control apparatus capable of causing a list of images corresponding to a plurality of respective contents to be displayed on a display unit,
wherein the method comprises:
acquiring attributes of the respective contents and, after acquisition of the attributes of the respective contents, receiving thumbnail images corresponding to the respective contents; and
generating a list screen using the received thumbnail images,
wherein said generating includes generating the list screen before the reception of thumbnail images by using temporary display objects predetermined in association with the acquired attributes of the contents, respectively, and by replacing the temporary display objects in the list screen using the received thumbnail images.

14. A non-transitory computer-readable storage medium storing a computer-executable program for causing a computer to execute a method of controlling a display control apparatus capable of causing a list of images corresponding to a plurality of respective contents to be displayed on a display unit, wherein the method comprises:

acquiring attributes of the respective contents and, after acquisition of the attributes of the respective contents, receiving thumbnail images corresponding to the respective contents;

generating a list screen using the received thumbnail images; and determining whether or not a time period required to receive the thumbnail images corresponding to the respective contents exceeds a predetermined time period, wherein said generating includes generating the list screen before the reception of thumbnail images by using temporary display objects and by replacing the temporary display objects in the list screen using the received thumbnail images, in a case where said determining determines that the time period required to receive the thumbnail images exceeds the predetermined time period, whereas said generating includes generating the list screen using the received thumbnail images, without using the temporary display objects, in a case where said determining determines that the time period required to receive the thumbnail images does not exceed the predetermined time period.

* * * * *